Nov. 22, 1927.
W. N. BOOTH
1,649,945
DRIVING DEVICE FOR DEMOUNTABLE RIMS
Original Filed March 25, 1922
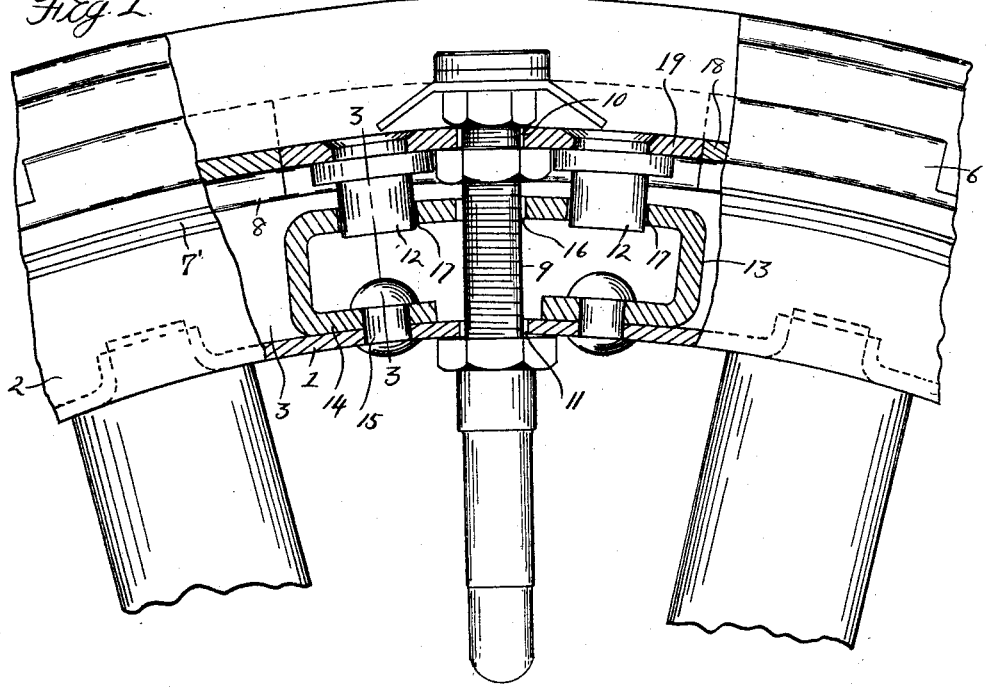
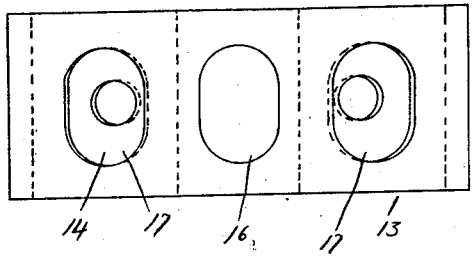
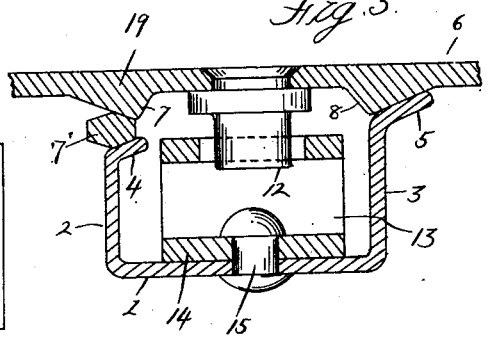
Inventor
William N Booth
Attorneys Patented Nov. 22, 1927.

1,649,945

UNITED STATES PATENT OFFICE.

WILLIAM N. BOOTH, OF DETROIT, MICHIGAN.

DRIVING DEVICE FOR DEMOUNTABLE RIMS.

Application filed March 25, 1922, Serial No. 546,662. Renewed May 10, 1923.

The invention relates to devices for driving demountable rims from metallic felleys or channel-shaped permanent rims of wheels, and has for one of its objects the provision of a simple device which can be readily formed and secured to the permanent rim and which is adapted to engage a driving projection or stud secured to a demountable rim when the latter is mounted upon the permanent rim. Another object is the provision of a driving device upon the permanent rim having means for interchangeably receiving and driving a driving projection or stud secured to a demountable rim, thereby permitting of reversibly mounting the demountable rim upon the permanent rim. With these as well as other objects in view, the invention resides in the novel features of construction as more fully hereinafter set forth.

In the drawings:

Figure 1 is a side elevation partly in section of a part of a metallic felly or permanent rim and a demountable rim, showing my driving device;

Figure 2 is a plan view of the driving device;

Figure 3 is a cross section on the line 3—3 of Figure 1.

1 is the metallic felly or channel-shaped permanent rim of a motor vehicle wheel having side flanges 2 and 3 terminating in inclined seats 4 and 5 respectively, and 6 is a demountable rim having beads 7 and 8.
The bead 8 is adapted to engage the seat 5 while the bead 7 is adapted to engage the wedge ring 7' when the latter engages the seat 4. 9 is the radial valve stem extending inwardly from the inner tube of the tire and passing through the opening 10 in the demountable rim 6 and also through the opening 11 in the permanent rim 1. The demountable rim also has the radial inwardly extending projections or studs 12 which are peripherally spaced equal distances on opposite sides of the opening 10 in the demountable rim.

To drive the demountable rim from the permanent rim and at the same time to permit of reversibly mounting the demountable rim upon the permanent rim, I have provided the inverted channel-shaped plate 13 having the inwardly extending feet 14 fixedly secured to the base of the permanent rim 1 by suitable means such as the rivets 15. The web of this channel has the central opening 16 registering with the opening 11 in the permanent rim and also has the openings 17 at opposite sides of the opening 16 and adapted to be alternatively engaged in by the driving projections or studs 12 upon the demountable rim, these latter openings being located to register the opening 10 in the demountable rim with the opening 16 in the plate. Also, the openings 17 register with the openings in the plate for receiving the rivets 15 so that the plate can be readily secured to the permanent rim.

In the present instance, the demountable rim 6 comprises the transversely split main section 18 and the filler section or bridge plate 19 insertable between the ends of the main section and provided with the opening 10 for the passage of the valve stem and with the inwardly extending projections or studs 12, the filler section being reversible with respect to the main section as well as the permanent rim.

What I claim as my invention is:

1. The combination with a permanent rim and a demountable rim mounted thereon and provided with an inwardly extending driving projection, of a driving device for said demountable rim comprising a channel-shaped member secured to said permanent rim and provided with a plurality of openings for alternative engagement in by said driving projection.

2. The combination with a permanent rim and a demountable rim mounted thereon and provided with an inwardly extending driving projection, of a driving device for said demountable rim comprising an inverted channel-shaped member having inwardly extending feet fixedly secured to said permanent rim and having in its web a plurality of openings for alternative engagement in by said driving projection.

3. The combination with a permanent rim and a demountable rim mounted thereon and provided with an opening for the passage of a valve stem and also with an inwardly extending driving projection adjacent to the opening, of a driving device for said demountable rim comprising a channel-shaped member secured to said permanent rim and provided with an opening for engagement in by said driving projection and also with a second opening registering with the opening in said demountable rim and adapted for the passage of the valve stem.

4. The combination with a permanent rim of channel-shaped cross section and a demountable rim mounted thereon and provided with radial inwardly extending driving projections, of a driving device for said demountable rim comprising an inverted channel-shaped member fixedly secured to the base of said permanent rim and provided with a pair of openings for engagement in by said driving projections.

5. The combination with a permanent rim of channel-shaped cross section, and a demountable rim mounted thereon and provided with radial inwardly extending driving projections and an intermediate opening for the passage of a valve stem, of a driving device for said demountable rim comprising an inverted channel-shaped plate having inwardly extending feet fixedly secured to the base of said permanent rim and also having in its web a pair of openings for engagement in by said driving projections, and an intermediate opening registering with the opening in said demountable rim and adapted for the passage of the valve stem.

6. The combination with a permanent rim of channel-shaped cross section and a demountable rim mounted thereon and provided with a radially inwardly extending driving lug, of a driving device for said demountable rim comprising an inverted substantially channel-shaped plate having inwardly extending feet, and a pair of openings in its web for engagement in by said driving projection, and means for fixedly securing said feet to the base of said permanent rim, said means being in substantial alignment with said openings in the web of said plate.

7. The combination with a channel-shaped permanent rim and a demountable rim mounted thereon, of a driving projection upon one of said rims extending toward the other, and a cooperating driving device upon the other of said rims and located between the side flanges of said permanent rim, said device having a plurality of openings for alternative engagement in by said driving projection.

8. The combination with a channel-shaped permanent rim and a demountable rim mounted thereon, of a driving member upon one of said rims, and a cooperating driving member upon the other of said rims and located between the side flanges of said permanent rim, said cooperating driving member being provided with an opening for the passage of a valve stem, and with openings on opposite sides of said first-mentioned opening for alternative engagement with said first-mentioned driving member.

9. The combination with a channel-shaped permanent rim and a demountable rim, of a driving member upon one of said rims, and a cooperating driving member upon the other of said rims and located between the side flanges of said permanent rim, said cooperating driving member being provided with an opening for the passage of a valve stem and with another opening for engagement with said first-mentioned driving member.

10. The combination with a wheel body, including a rim and a demountable rim seated upon said first mentioned rim and provided with an opening for the passage of a valve stem, of a driving member upon one of said rims extending toward the other and a cooperating channel-shaped driving member upon the other of said rims extending toward said first mentioned rim, said channel-shaped driving member having provision in its web for the passage of the valve stem and also provision in its web at circumferentially equal distances from and on opposite sides of the valve stem for alternative driving engagement with said driving member.

11. The combination with a permanent rim and a demountable rim mounted thereon having an opening for the passage of a valve stem, of means for driving said demountable rim from said permanent rim including driving projections upon one of said rims extending toward the other and located upon opposite sides of the radial line passing through said opening, and a cooperating driving device upon the other of said rims and extending toward the first mentioned rims, said device embracing said driving projections and having an opening for the passage of the valve stem.

12. The combination with a permanent rim and a demountable rim mounted thereon having a filler section with an opening therethrough for the passage of a valve stem, of means for driving said demountable rim from said permanent rim including driving projections upon said filler section at opposite sides of said opening and extending toward said permanent rim, and a cooperating driving device upon said permanent rim having portions engageable with said driving projections and also having provision for the passage of the valve stem.

13. The combination with a permanent rim and a demountable rim mounted upon said permanent rim having a reversible filler section with an opening therethrough for the passage of a valve stem, of means for driving said demountable rim from said permanent rim including driving projections upon said filler section arranged symmetrically at opposite sides of said opening and extending toward said permanent rim and a cooperating driving device upon said permanent rim and extending toward said demountable rim, said driving device embracing said driving projections and having an opening for the passage of the valve stem.

In testimony whereof I affix my signature.

WILLIAM N. BOOTH.